3,089,847
INHIBITING BACTERIAL GROWTH
Ralph N. Thompson, Mount Lebanon, Pa., assignor to Hagan Chemicals & Controls, Inc., a corporation of Pennsylvania
No Drawing. Filed Apr. 15, 1960, Ser. No. 22,396
3 Claims. (Cl. 252—8.55)

This invention relates to bactericides and methods of inhibiting the growth of bacteria.

The class of microorganism with which this invention is primarily concerned is that of sulfate-reducing bacteria. The sulfate-reducing bacteria are anaerobic organisms which are quite destructive to underground steel and iron pipes, iron and steel immersed in sea water, and oil well casings, for example. The destructive characteristics of these organisms stems from their ability to reduce the sulfate radical to a sulfide, which in turn independently reacts with iron to form ferrous sulfide. The fact that the bacteria grow in colonies, often on the surface of steel parts, concentrates the corrosive effect of the bacteria, resulting in a serious pitting of the steel surface. Many such pits in the same general area may result in large patches of corroded casing or pipe. In addition, the ferrous sulfide, which is insoluble, may collect in clumps and hinder the free passage of fluids where it is desired, such as around an oil well hole.

There are several different theories of the chemical reactions by which the sulfate-reducers actually cause corrosion of steel and iron. It is not my purpose to adopt any of these theories. It is enough to say that the sulfate-reducers act on sulfate present in their environment to produce sulfides which in turn react with iron. It is quite possible that hydrogen depolarization on the surface of the metal tends to favor the growth of the organisms on the surface of the metal. In sewage conduits or tanks containing organic materials undergoing anaerobic decomposition, the sulfates may be reduced to sulfides, which in turn become oxidized to sulfuric acid, causing extensive damage. Other theories of the details of the corrosive effect in various environments may arise. Generally, any reducing environment having some sulfate content may contain sulfate-reducing bacteria.

I have discovered an extremely effective method of inhibiting the growth of sulfate-reducing bacteria, thus providing great savings for oil well operators and the like.

I have found that minute amounts of certain organotin complexes are extremely effective in inhibiting the growth of sulfate-reducing bacteria. The compositions I employ are disclosed in the patent application of Dietmar Seyferth S.N. 22,400, filed simultaneously herewith, entitled "Novel Organo Tin Compounds." The chemical composition of the reaction mixture is not known. Generally, the compositions which I have found useful in my invention can be prepared by mixing tetramethyl ammonium chloride and a compound of the general formula $R_3SnCl$, and heating the mixture for 1 to 8½ hours at a temperature from 100° C. to 200° C., where R is a methyl, ethyl, or propyl group. Specifically, the compositions may be prepared according to the following examples:

EXAMPLE I 4.36 g. tetramethyl ammonium chloride were mixed with 4.82 g. triethyl tin chloride and heated at 200° C. for 6½ hours. The resultant solid was washed with ligroin (petroleum ether), leaving 7.9 g. product.

EXAMPLE II 6.6 g. $(CH_3)_4NCl$ were mixed with 7.4 g. triethyl tin chloride and heated at 100–120° C. for 1½ hours. The resultant solid was washed with ligroin, yielding 12.0 g. product.

EXAMPLE III 2.88 g. $(CH_3)_4NCl$ were mixed with 3.5 g. $[CH_3]_3SnCl$ and heated at 140–150° C. for 8½ hours. The resultant solid was washed with ligroin, yielding 6 g. product.

EXAMPLE IV 5.8 g. $(CH_3)_4NCl$ were mixed with 7 g. $[CH_3]_3SnCl$ and heated at 120° C. for 1¾ hours. The cooled solid was washed with ligroin, leaving 11.8 g. product.

Each composition is white, very water-soluble, and insoluble in ether ligroin, or the like. Although I am not certain of the chemical compositions, it is probable that each contains $[(CH_3)_4N]_2[R_3SnCl_3]$ as its major constituent, where R is a methyl or an ethyl group. In addition, it is thought that there is a minor amount of $[(CH_3)_4N][R_3SnCl_2]$. There may or may not be a trace of $(CH_3)_4NCl$; however, it has been determined that this compound alone does not inhibit the growth of sulfate-reducing bacteria.

Tests were run in the laboratory using these compositions against sulfate-reducing bacteria. The particular organism used in these was "Strain A" of the species *Desulfovibrio desulfuricans*, the parent culture of which was obtained from the University of Texas. The tests were performed in media of fresh water and artificial brine. Experience has shown that many bacteriostatic compositions may be very effective in fresh water but completely ineffective in brine, which is found in southwestern and other oil fields.

The fresh water medium was made up in the laboratory of the following ingredients:

| | | |
|---|---|---|
| Sodium lactate | ml | 8.0 |
| Yeast extract | g | 2.0 |
| Ascorbic acid | g | 0.2 |
| $MgSO_4 \cdot 7H_2O$ | g | 0.4 |
| $K_2HPO_4$ (anhyd.) | g | 0.02 |
| $Fe(SO_4)_2(NH_4)_2 \cdot 6H_2O$ | g | 0.2 |
| NaCl | g | 20.0 |
| Deionized water | ml | 1000 |

The pH of the medium was adjusted with NaOH to 7.2–7.5. The medium, without the iron salt, was sterilized at 15 pounds pressure for ten minutes. The iron salt was added after autoclaving.

The artificial brine medium was made as follows:

Stock solution #1:
    556 g. $MgCl_2 \cdot 6H_2O$
    58 g. anhydrous $CaCl_2$
    2 g. $SnCl_2 \cdot 6H_2O$
    1000 ml. distilled water Stock solution #2:
    70 g. KCl
    20 g. $NaHCO_3$
    10.1 g. KBr
    2.7 g. $H_3BO_3$
    .3 g. NaF
    1000 ml. distilled water Stock solution #3:
    50 g. NaCl
    10 g. $Na_2SO_4$
    1000 ml. distilled water To solution #3 was added:
    8 ml. sodium lactate
    2 g. yeast extract
    0.2 g. ascorbic acid
    0.02 g. $K_2HPO_4$
    0.2 g. $Fe(SO_4)_2(NH_4)_2 \cdot 6H_2O$ (after sterilization)

Then to solution #3 was added:
    40 ml. stock solution #1
    20 ml. stock solution #2

The fresh and artificial brine media were seeded with 20 ml. per liter of actively growing 24-hour liquid culture of *Desulfovibrio desulfuricans* which had been transplanted three successive days. The strain used was Strain A, obtained from the University of Texas. Strain A of the species *Desulfovibrio desulfuricans* has been designated by the American Petroleum Institute as the recognized test culture for the sulfate-reducing bacteria in testing for bacteriostatic and bacteriocidal controls. It is the most common strain of sulfate-reducing bacteria present in the southwestern oil fields.

After seeding of the medium, 16.2 ml. of it was added to test tubes containing 16.2 ml. of solutions of the inhibitor chemical. In each case the inhibitor chemical was at double the desired strength for the test. That is, for the 1 p.p.m. test, the strength of the 16.2 ml. of inhibitor chemical was 2 p.p.m., that for the 5 p.p.m. test was 10 p.p.m., and so forth. The test tubes were capped and inverted to assure that no air could enter, and incubated for 30 days at 34.5° C. with results as follows:

*Composition of Example I (Concentration)*

|  | 1 p.p.m. | 5 p.p.m. | 10 p.p.m. |
|---|---|---|---|
| Fresh water medium | (−) | (−) | (−) |
| Artificial brine medium | (−) | (−) | (−) |

*Composition of Example II (Concentration)*

|  | 1 p.p.m. | 5 p.p.m. | 10 p.p.m. |
|---|---|---|---|
| Fresh water medium | (−) | (−) | (−) |
| Artificial brine medium | (−) | (−) | (−) |

*Composition of Example III (Concentration)*

|  | 1 p.p.m. | 5 p.p.m. | 10 p.p.m. |
|---|---|---|---|
| Fresh water medium | (+) | (−) | (−) |
| Artificial brine medium | (+) | (−) | (−) |

The term (+) indicates that the medium turned black. The term (−) means it retained its relatively clear appearance and did not turn black.

The tests were repeated in the case of Examples I and II, and again proved negative after 20 days incubation.

In each test, all three controls turned black.

Having thus described a present preferred embodiment of my invention and illustrated certain present preferred methods of practicing the same, it is to be distinctly understood that the invention is not limited thereto but may be otherwise variously embodied and practiced within the scope of the following claims:

I claim:

1. The method of inhibiting the growth of sulfate-reducing bacteria comprising treating said sulfate-reducing bacteria with a composition prepared by mixing tetramethyl ammonium chloride and a compound of the general formula $R_3SnCl$ in a molar ratio of from about 1.5 to 1 to about 2.0 to 1, and heating the mixture for 1 to 8½ hours at a temperature from 100° C. to 200° C., where R is an alkyl group of less than four carbon atoms.

2. The process of inhibiting corrosion of oil well casings and the like in contact with oil field brine which corrosion is due to sulfate-reducing bacteria comprising adding to the brine in contact with said oil well casings and the like a small amount of a composition prepared by mixing tetramethyl ammonium chloride and a compound of the general formula $R_3SnCl$ in a molar ratio of from about 1.5 to 1 to about 2.0 to 1, and heating the mixture for 1 to 8½ hours at a temperature from 100° C. to 200° C., where R is an alkyl group of less than four carbon atoms.

3. The method of inhibiting corrosion of ferrous metals in an environment conducive to the growth of *Desulfovibrio desulfuricans* comprising adding to said environment a small amount of a composition prepared by mixing tetramethyl ammonium chloride and a compound of the general formula $R_3SnCl$ in a molar ratio of from about 1.5 to 1 to about 2.0 to 1 and heating the mixture for 1 to 8½ hours at a temperature from 100° C. to 200° C., where R is an alkyl group of less than four carbon atoms.

References Cited in the file of this patent
UNITED STATES PATENTS

| 2,172,979 | Kohler et al. | Sept. 12, 1939 |
| 2,580,473 | Sowa et al. | Jan. 1, 1952 |
| 2,692,231 | Stagner et al. | Oct. 19, 1954 |
| 2,882,227 | Lindberg | Apr. 14, 1959 |